United States Patent [19]

Vaughan

[11] Patent Number: 4,965,059
[45] Date of Patent: * Oct. 23, 1990

[54] HIGH SILICA FAUJASITE ALUMINOSILICATE, ECR-4, AND A PROCESS FOR MAKING IT

[75] Inventor: David E. W. Vaughan, Flemington, N.J.

[73] Assignee: Exxon Research & Engineering Company, Florham Park, N.J.

[*] Notice: The portion of the term of this patent subsequent to Dec. 22, 2004 has been disclaimed.

[21] Appl. No.: 356,472

[22] Filed: Jun. 30, 1989

Related U.S. Application Data

[63] Continuation-in-part of Ser. No. 118,326, Nov. 6, 1987, abandoned, which is a continuation-in-part of Ser. No. 606,940, May 4, 1984, Pat. No. 4,714,601.

[51] Int. Cl.$^5$ .................................................. C01B 33/28
[52] U.S. Cl. .................................................... 423/328
[58] Field of Search ............... 423/326, 328, 329, 330, 423/331, 332; 502/79, 164

[56] References Cited

U.S. PATENT DOCUMENTS

| | | | |
|---|---|---|---|
| 3,415,736 | 12/1968 | Ciric | 423/328 |
| 3,433,589 | 3/1969 | Ciric et al. | 423/328 |
| 3,574,538 | 4/1971 | McDaniel et al. | 423/328 |
| 3,639,099 | 1/1972 | Elliott, Jr. et al. | 423/328 |
| 3,642,434 | 2/1972 | Dwyer | 423/328 |
| 3,671,191 | 6/1972 | Maher et al. | 423/328 |
| 3,972,983 | 8/1976 | Ciric | 423/328 |
| 4,714,601 | 12/1987 | Vaughan | 423/328 |

Primary Examiner—John Doll
Assistant Examiner—R. Bruce Breneman
Attorney, Agent, or Firm—Ronald D. Hantman

[57] ABSTRACT

An aluminosilicate characterized by having a faujasite structure, a silica to alumina mole ratio of at least six and unbalanced tetra alkylammonium ions within the large cages of the aluminosilicate. This composition may be prepared by crystallization from an aged reaction mixture of an oxide of sodium, tetra alkyl or hydroxy alkyl ammonium, salt, water, a source of silica, a source of alumina and sodium aluminosilicate nucleating seeds in specified relative amounts.

12 Claims, 3 Drawing Sheets

FIG. 3B

HIGH SILICA FAUJASITE ALUMINOSILICATE, ECR-4, AND A PROCESS FOR MAKING IT

This is a continuation-in-part of U.S. Ser. No. 118,326, filed Nov. 6, 1987, now abandoned, which is a continuation-in-part of U.S. Ser. No. 606,940, filed May 4, 1984, now U.S. Pat. No. 4,714,601.

FIELD OF THE INVENTION

The present invention relates to a high silica polymorph, designated as ECR-4, having the faujasite structure and containing organic ions larger than tetramethyl ammonium ions. It also relates to a process for preparation of the zeolite. It may be employed in catalytic, absorbent or separation applications, particularly in cracking and hydrocracking catalysts.

BACKGROUND OF THE INVENTION

Zeolites with high silica to alumina ratios, i.e., of at least six, are desirable because of their particular catalytic selectivity and their thermal stability; the latter is a property particularly important when the zeolite is used as catalyst or in adsorption procedures wherein exposure to high temperatures would be expected. Although zeolites having silica to alumina ratios of less than six can be readily synthesized by a variety of methods, as disclosed, e.g., in U.S. Pat. Nos. 2,882,244 and 4,178,352. Methods for preparing faujasite polymorphs of higher ratios generally involve several weeks of crystallization and result in poor yields of product, as reported by Kacirek, J. Phy. Chem., 79 1589 (1975). One successful method results in a high silica faujasite, CSZ-3, that contains $CS^+$ cations trapped within the sodalite cage subunits of the structure and has a composition $(Na, Cs)_2O: Al_2O_3: 5-7\ SiO_2$; See U.S. Pat. No. 4,333,859. A similar material is CSZ-1 (U.S. Pat. No. 4,309,313), having a similar composition, but having a rhombohedral structural distortion (Treacy et al., J. C. S. Chem Comm., p 1211, (1986)).

The use of quaternary ammonium salts as templates or reaction modifiers in the preparation of synthetic crystalline aluminosilicates (zeolites), first discovered by R. M. Barrer in 1961, has led to preparation of zeolites with high silica to alumina ratios which are not found in nature. For example, U.S. Pat. No. 4,086,859 discloses preparation of a crystalline zeolite thought to have the ferrierite structure (ZSM-21) using a hydroxethyl-trimethyl sodium aluminosilicate gel. A review provided by Barrer in Zeolites, Vol. I, p. 136 (October, 1981) shows the zeolite types which are obtained using various ammonium organic bases as cation. In addition, Breck, Zeolite Molecular Sieves, John Wiley (New York, 1974), pp. 348-378, provides a basic review of zeolites obtained using such ammonium cations in the synthesis thereof, as does a review by Lok et al (Zeolites, 3, p 282 (1983)).

The Si/Al ratios of a variety of readily synthesized NaY materials can be increased by a wide range of chemical or physical chemical treatments. However, these processes usually involve removal of Al from the zeolite framework and creation of a metastable defect structure, followed by filling the defects with Si from another part of the structure by further chemical treatments or hydrothermal annealing. Typical treatments use steam, e.g., U.S. Pat. No. 3,293,192; acid leaching, e.g., U.S. Pat. No. 3,506,400; treatments with EDTA, e.g., U.S. Pat. No. 4,093,560; treatment with $SiCl_4$ (Beyer and Belenykaja, Catalysis by Zeolites S, p. 203 (1980), Elsevier Press.); treated with $CHF_3$, i.e., U.S. Pat. No. 4,275,046; or treated with other chemicals. The products are often called 'ultra stable' faujasites (cf. Maher and McDaniel Proceedings Intl. Conference on Molecular Sieves, London, 1967, Ed. R. M. Barrer) because of their very high thermal and hydrothermal stability. However, such chemical processing often yields variable products, requires multi-step processing, often using highly corrosive environments, and usually involves a yield debit in the form of partly collapsed or blocked zeolite product. Few of the modified materials have the product quality of the starting sample because the process of modification involves partial destruction of the lattice and/or deposition of detrital reaction products within the pores of the structure. The existence of a secondary pore structure within the mesopore range has been reported (Lhose et al, Zeolites, 4 p 163, (1984)). Very recently "framework exchange" treatments of NaY using ammonium silicon hexafluoride (Eur. Pat. Appln. No. 008221) have yielded higher silica faujasite materials. However, these seem to contain undesirable residual $F^-$ anions (presumably replacing $(OH)^-$) and are somewhat limited in the degree of possible modifications using single treatments. Any chemical dealumination treatment may be expected to react more preferentially with the crystal exterior surface, giving a chemical concentration gradient from the outside to the center of the crystal, particularly where large sterically hindered molecules are concerned. Such observations have been made by Namba et al (Zeolites, 6, p 107 (1986)). Such preferred chemical distributions may be expected to have significant catalytic effects. Methods of directly synthesizing high silica faujasite would therefore be useful in optimizing both the zeolite product and the process for its production.

Although the disclosed ECR-4 composition is quite chemically and thermally stable in its own right because of its high silica content, that stability makes the inventive composition particularly useful as a starting material for the dealumination processes described above. Since the number of aluminum atoms in the framework of the inventive composition is lower than in zeolite Y, removal of these atoms causes less framework metastability during dealumination.

The use of tetramethyl ammonium cations (TMA) in the synthesis of zeolites A, Y and ZSM-4 (mazzite) is known, e.g., U.S. Pat. Nos. 3,306,922; 3,642,434; 4,241,036 and 3,923,639. In all these cases the TMA is trapped in the smaller cavities in the structures (sodalite or gmelenite cages), and must be burned out at high temperatures, often leading to lattice disruption and collapse. In most of these syntheses the $SiO_2/Al_2O_3$ ratio of the zeolites is less than about 6.

In summary, the present invention is seen to provide a novel crystalline aluminosilicate, ECR-4, which has a faujasite structure and a silica to alumina ratio of at least six, and contains alkyl ammonium cations within its structure which can be readily removed at relatively low calcination temperatures. It may be viewed as a major improvement over its chemically modified counterparts, from which it may be differentiated by considering:

o Development of non-selective mesopores
o Occluded detrital Al and Si species
o Residual $F^-$ anions
o Crystal Si/Al composition gradients all of which are absent in ECR-4. These undesirable features may be readily observed by a variety of instrumental techniques, including sorption measurements, catalytic properties, $^{19}F$, $^{29}Si$ and $^{27}Al$-MASNMR, and microprobe analysis.

It is also known that even minor changes in the size or charge distribution of these large organic cations can induce the formation of different zeolite structures. U.S. Pat. No. 4,046,859 teaches that replacement of one of the methyl groups of the TMA compound with a hydroxy ethyl group causes the formation of a ferrierite-like phase (ZSM-21). Many such examples are enumerated by Barrer (Zeolites, 1981). The objective of the present invention is to develop faujasite preparation methods yielding high silica materials, where the organic templates are not locked into the small cavities in the structure, but are instead present in the large "super cages" from which they can be readily removed without disruption and degradation of the host lattice.

SUMMARY OF THE INVENTION

According to the present invention a high silica crystalline polymorph (zeolite), designated for convenience herein as ECR-4, having the faujasite structure and a $SiO_2/Al_2O_3$ mole ratio of at least six can be readily prepared which contains organic templates larger than TMA, e.g., bis-(2-hydroxyethyl)dimethylammonium ions, within the large cages of the aluminosilicate. The chemical composition for this zeolite, expressed in terms of mole ratios of oxides, is in the range:
0.02 to 0.8 $T_2O$:0.20 to 0.98 $Na_2O$:$Al_2O_3$:6 to 12 $SiO_2$:x$H_2O$
wherein T represents an unbalanced organic template of the type $R_1R_2R_3R_4N+$ where $R_n$ represents an alkyl or hydroxy alkyl chain having, variously, between 1 and 4 or 2 and 4 carbon atoms, and x represents 0 or an integer from 1 to 25, depending on composition and degree of hydration. The ammonium ion is unbalanced in that the four alkyl or hydroxy alkyl substituents or the ammonium ion are not the same. The more preferred composition for the zeolite is in the range: 0.02 to 0.80 $T_2O$:0.20 to 0.98 $Na_2O$:$Al_2O_3$:8 to 12 $SiO_2$:x$H_2O$.

The aluminosilicate herein may be used as a sorbent or as a catalyst, e.g., as a hydrocarbon conversion catalyst for, e.g., cracking, hydrocracking, reforming, paraffin isomerization, aromatization, and alkylation. When the product is used as a catalyst, it may be exchanged with cations from Group II through VIII of the Periodic Table to remove the excess sodium ions which may be undesirable. Even after this ion exchange some of the alkyl or hydroxylalkyl ammonium cations will remain trapped in the super cages of the faujasite structure. Those cations may be removed by calcination.

In another embodiment of this invention the novel aluminosilicate may be prepared by a process comprising:

(a) preparing a reaction mixture comprising an oxide of sodium, an alkyl or hydroxy alkyl ammonium salt, water, a source of silica, a source of alumina, and sodium aluminosilicate nucleating seeds, said reaction mixture having a composition, in terms of mole ratios of oxides, within the following ranges:

| | |
|---|---|
| $(Na,T)_2O$:$Al_2O_3$ | 1.6 to 8 |
| $SiO_2$:$Al_2O_3$ | 6 to 40 |
| $H_2O$:$Al_2O_3$ | 200 to 400 | where T represents an alkyl or hydroxy alkyl ammonium cation, and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture at a temperature between about 70° C. and 120° C. under autogenous pressure for a sufficient period of time to form crystals of the aluminosilicate; and (d) recovering the aluminosilicate crystals.

It will be understood that the compositions herein may contain some waters of hydration (the x value above) which may be at least partially removed when the zeolites are employed as sorbent or catalysts.

DESCRIPTION OF THE PREFERRED EMBODIMENTS

The aluminosilicate herein generally will have the formula, in terms of mole ratios of oxides, in the range: 0.02 to 0.80 $T_2O$:0.20 to 0.98 $Na_2O$:$Al_2O_3$:6 to 12 $SiO_2$:x$H_2O$
or preferably 0.02 to 0.60 $T_2O$:0.40 to 0.98 $Na_2O$:$Al_2O_3$:8 to 12 $SiO_2$:$H_2O$ where x is 0–25 and T is an unbalanced organic ammonium group of the general formula $R_1R_2R_3R_4N+$. $R_1$ and $R_2$ are alkyl or hydroxy alkyl groups having carbon members ranging separately from 1 to 4; $R_3$ and $R_4$ are alkyl or hydroxy alkyl groups having carbon numbers ranging separately from 2 to 4. The term "unbalanced" is meant to indicate that $R_1$, $R_2$, $R_3$ and $R_4$ are not all the same. The T group is, in any event, larger than the tetramethyl ammonium ion. Especially suitable T groups include diethyldimethyl ammonium (E2M2), dipropyldimethylammonium, bis-(2-hydroxy propyl)dimethyl ammonium, bis-(2-hydroxy ethyl)dimethyl ammonium, and tributyl methyl ammonium.

The unbalanced alkyl or hydroxyalkyl ammonium cations are relatively large ions which are not trapped within the sodalite cages of the aluminosilicate faujasite structure, but are present in the super cages of the structure.

Minor variations in the mole ratios of the oxides within the ranges given in the chemical formulas above do not substantially alter the structure or properties of the zeolite. In addition, the number of waters of hydration x in the formula will not be the same for each preparation and will depend mainly on the degree to which the aluminosilicate is dried, and the amount of template.

In order to convert the inventive high silica faujasite zeolites into catalysts, the organic ions in the "super cages" of the zeolite are first exchanged, desorbed or degraded at high temperature. By comparison to other zeolites having ammonium ions trapped in their smaller cages, the temperature of calcination is significantly lower. As even large decomposition organic fragments may easily diffuse through the large pores of the zeolite ECR-4, bond breakage and lattice degradation usually associated with the escape of such fragments from the smaller cages is not observed in ECR-4.

The exchangeable cations which may partially or fully replace the sodium ions wherever they may be found and the organic ammonium ions in the large cages of the faujasite structure may be cations of metals from any one of Groups I through VIII of the Periodic Table or rare earth metals, depending on the end use desired. Preferably, the cations will be mono-, di- and trivalent metal cations, particularly from Groups I, II or III of the Periodic Table, such as barium, calcium, cesium, lithium, magnesium, potassium, strontium, zinc, or the like, or hydrogen, rare earth metals, or ammonium or alkylammonium ions. The presence of these exchangeable cations will generally not cause a substantial alteration of the basic crystal structure of the aluminosilicate. Particularly preferred are mono- and divalent cations, as they are more easily included in the pores of the zeolite crystal. Any ion exchange technique may be employed such as those discussed, for example, in U.S. Pat. No. 3,216,789.

The aluminosilicate herein may be prepared by a process in which a reaction mixture, generally a slurry, is formed comprised of an oxide of sodium, water, the organic ammonium salt, a source of silica, a source of alumina, and sodium zeolitic (aluminosilicate) nucleating seeds. The oxide of sodium may be, e.g., sodium hydroxide, and the organic ammonium salt may be a sulfate, nitrate, hydroxide or halide salt, and is preferably a halide such as the chloride, iodide or bromide salt because of lower cost. The silica may be derived from sources such as e.g., silica gels, silica acid, aqueous colloidal silica sols as described, for example, in U.S. Pat. No. 2,574,902, reactive amorphous solid silicas such as fume silicas and chemically precipitated silica sols, and potassium or sodium silicate, preferably sodium silicate or silica sols. The alumina may be derived from sources such as e.g., activated alumina, gamma alumina, alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina if, for example, sodium silicate and sodium aluminate (prepared by dissolving NaOH and $Al_2O_3 \cdot 3H_2O$ in water) are respectively employed as at least one of the silica and alumina sources. The preferred sources of alumina are hydrated alumina and an aluminum salt selected from the chloride, sulfate and nitrate salts.

The aluminosilicate nucleating seeds for the reaction mixture, also known as zeolitic nucleation centers, comprised of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

4 to $30Na_2O$:1 to $9Al_2O_3$:3 to $30SiO_2$:250 to $2000H_2O$

Such slurries of nucleating seeds may be prepared by the process disclosed in U.S. Pat. Nos. 3,808,326 and 4,178,352, the disclosures of which are incorporated by reference. In general, the preparation procedure involves mixing of sodium silicate, sodium aluminate and water together and aging the resulting slurry at about 0° to 90° C. for about 1 to 500 hours, with lower temperatures requiring a longer period of time. Preferably, the slurry is aged at about 15° to 40° C. for about 20 to 400 hours and the zeolite centers have composition in the range:

10 to $16Na_2O$:1 to $9Al_2O_3$:10 to $15SiO_2$:250 to $2000H_2O$

The amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein will also serve as nucleation seeds.

The relative amounts of ingredients in the reaction mixture will be such that the mixture has a composition, in terms of mole ratios of oxides, within the following ranges:

| Oxide Constituents | Ranges of Mole Ratios |
|---|---|
| $(Na,T)_2O:Al_2O_3$ | 1.6 to 8 |
| $SiO_2:Al_2O_3$ | 6 to 40 |
| $H_2O:Al_2O_3$ | 200 to 400 | where T represents an organic ammonium group as described above. Preferably, the mole ratio of $H_2O$ to $Al_2O_3$ in the reaction mixture ranges from 200 to 250 and the mole ratio of $SiO_2$ to $Al_2O_3$ from 7 to 24.

The order of mixing the ingredients is not essential, and all ingredients may be added simultaneously. In one preferred method of preparation a sodium silicate solution, a slurry of nucleating seeds and an organic ammonium halide solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss.

After the reaction mixture is formed it may be homogenized by thorough blending so as to be substantially homogeneous in texture. This step is to ensure that the aluminosilicate product ultimately obtained is not a mixture of products and thus impure. The mixing may take place in any vessel in which complete mixing, e.g., a blender.

The homogenized mixture is then placed in a reactor, ordinarily one which can withstand elevated pressures such as a tetrafluoroethylene-lined jar or an autoclave, where it is maintained at a temperature of between about 70° C. and 120° C., preferably 85° and 100° C., and, for commercial purposes, preferably no greater than 100° C. The exact temperature will depend, for example, on the amount of sodium oxide present and the length of time employed for reaction. At temperatures above about 120° C., the zeolites obtained are no longer in substantially pure form. When the homogenized mixture is heated it is maintained at autogenous pressures which will depend on the temperature employed. Lower pressures of 1 atm may be adequate for temperatures at the lower range but at higher temperatures up to 120° C. pressures of up to about 3 to 5 atm or higher may be achieved. The amount of time required for heating will depend mainly on the temperature employed, so that at 70° C. to 100° C. the heating may be carried out, e.g., for up to 8 days or more, whereas at, e.g., 100° C. or more the time period may be e.g., 3 to 7 days. In any event, the heating is carried out until crystals are formed of the aluminosilicate zeolite product, i.e., ECR-4, having a faujasite structure, a mole ratio of $SiO_2/Al_2O_3$ of at least six and the presence of organic ammonium templates removable below about 400° C. as shown by thermogravimetric analysis.

The crystallization time may be shortened, if desired, by seeding the slurry before or after the blending step with minor amounts of zeolite ECR-4 crystals of this invention which are preferably chopped at low temperatures and a size range less than about 0.05 u before that seeding.

When the aluminosilicate crystals have been obtained in sufficient amount, they are recovered by centrifugation or filtration from the reaction mixture and are then washed, preferably with deionized water, to separate them from the mother liquor. The washing should continue, for best purity results, until the wash water, equilibriated with the product, has a pH of between about 9 and 12. After the washing step the zeolite crystals may be dried as in a kiln.

The aluminosilicate ECR-4 of this invention may be used as a sorbent or as a catalyst, e.g., in a hydrocarbon conversion process such as in paraffin isomerization, aromatization, and alkylation and in the, reforming, hydrocracking and cracking of lube stocks, fuels and crude oils. To be employed for these applications, the aluminosilicate may be at least partially dehydrated by drying at temperatures of up to about 500° C. or more until most or all of the water of hydration is removed.

ANALYTICAL PROCEDURE

A zeolite may be definitively identified by its x-ray diffraction pattern and chemical composition obtained by a variety of bulk chemical analyses. The unit cell measurement for various faujasites, in particular, has become a measurement (ASTM method D-3942-80) standardized to reflect the Si/Al ratio of the pure sodium form synthetic faujasite, e.g., D. W. Breck and E. M. Flanigen, "Molecular Sieves", Society of Chemistry and Industry, London, p. 47 (1968); E. Dempsey et al, J. Phys. Chem., 73, (1968), p. 387. Unfortunately, substitution of cations other than $Na^+$ into faujasite renders the established "unit cell vs. composition" relationship valueless. Since ECR-4 contains organic cations in addition to $Na^+$, unit cell correlations obtained by these methods have little value. Na-ECR-4 may be defined by the essential diffraction lines.

TABLE A

| MAJOR X-RAY DIFFRACTION PEAKS FOR ECR-32 | |
|---|---|
| d Spacing (Å) | Relative Intensity |
| 14.05–14.20 | VS |
| 8.60–8.70 | M |

TABLE A-continued

| MAJOR X-RAY DIFFRACTION PEAKS FOR ECR-32 | |
|---|---|
| d Spacing (Å) | Relative Intensity |
| 7.32–7.44 | W |
| 7.00–7.15 | W |
| 5.58–5.65 | S |
| 4.68–4.75 | M |
| 4.30–4.35 | M |
| 3.85–3.90 | W |
| 3.70–3.75 | M-S |
| 3.40–3.45 | W |
| 3.25–3.30 | M |
| 2.97–3.05 | W |
| 2.87–2.90 | M-W |
| 2.81–2.84 | M |
| 2.72–2.75 | W |
| 2.59–2.63 | W |
| 2.34–2.37 | W |

(VS = 100–80; S = 80–40; M = 40–15; W = 3–15 in absolute value ranges)

A valuable indirect measurement of Si/Al ratio has been developed recently which, to a first approximation, is not significantly influenced by variable cations contents. Known as $^{29}Si$- magic angle spinning nuclear magnetic resonance (MSA-NMR), it measures the relative number of Si atoms surrounded by 4 Al, (3Al+1Si), (2Al+2Si), (1Al+3Si) and 4Si, from which the total average Si/Al ratio can be readily calculated (Melchior et al., J. Amer. Chem. Soc., v. 104, p. 4859, (1982)). A plot of the relative intensities of the different Si sites in the higher Si/Al range is given in FIG. 1. Compared with the conventional Y faujasite, ECR-4 compositions may clearly be differentiated on the basis of relative peak values, vis., in the case of ECR-4 the number of Si atoms having zero and one Al neighbors is greater than the number of Si atoms having 2 and 3 Al neighbors. For zeolite Y the reverse is true.

Figure 1:
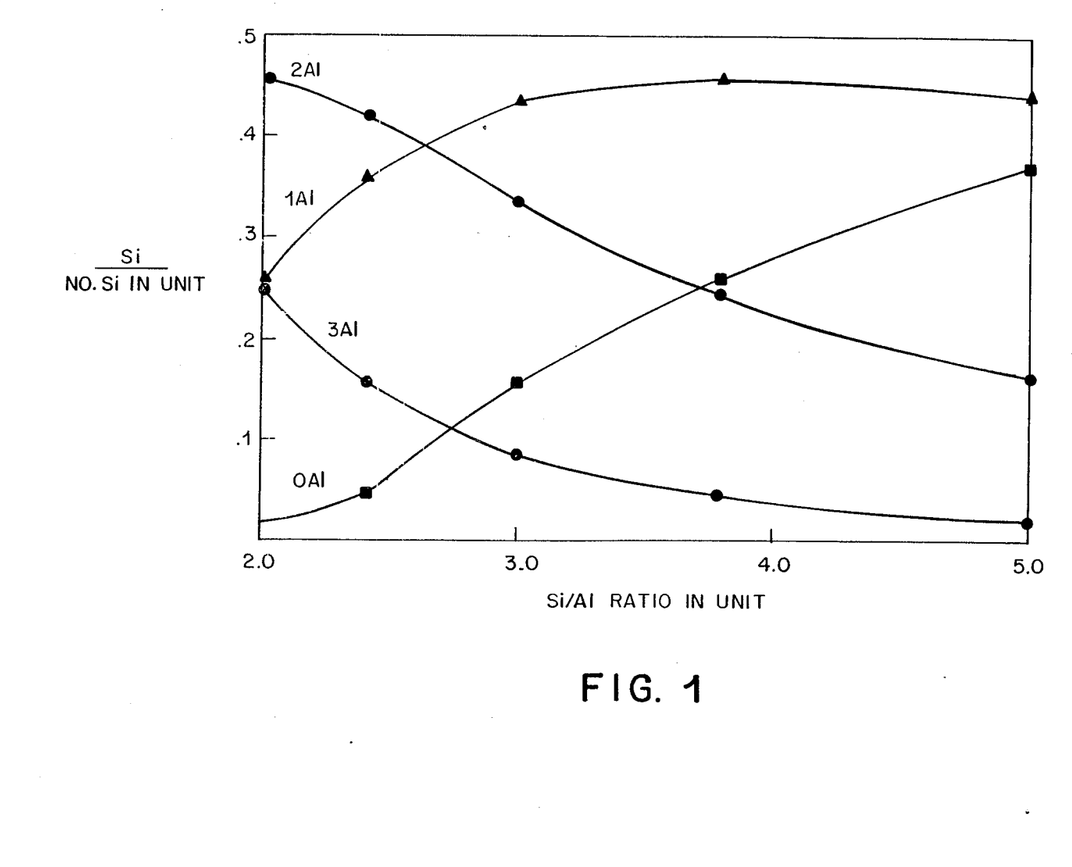
FIG. 1 shows calculated relative intensities in a MAS-NMR of aluminum neighbor distribution around silicon atoms in an ordered 6R structure as a function of Si/Al.

ECR-4: Si(OAl)+Si(1Al) > Si(2Al)+Si(3Al)
Zeolite Y: Si(0Al)+Si(1Al) < Si(2Al)+Si(3Al)

It should be apparent that $^{29}Si$-MAS-NMR spectra give a more reliable indication of the number of Si and Al atoms in a sample then would a comparable bulk chemical test. The MAS-NMR method ignores detrital or adsorbed and dissolved silicon and aluminum atoms since it measures those atoms when they are in particular spatial relationship to each other. Bulk chemical tests have no way to make such a differentiation.

Figure 2:
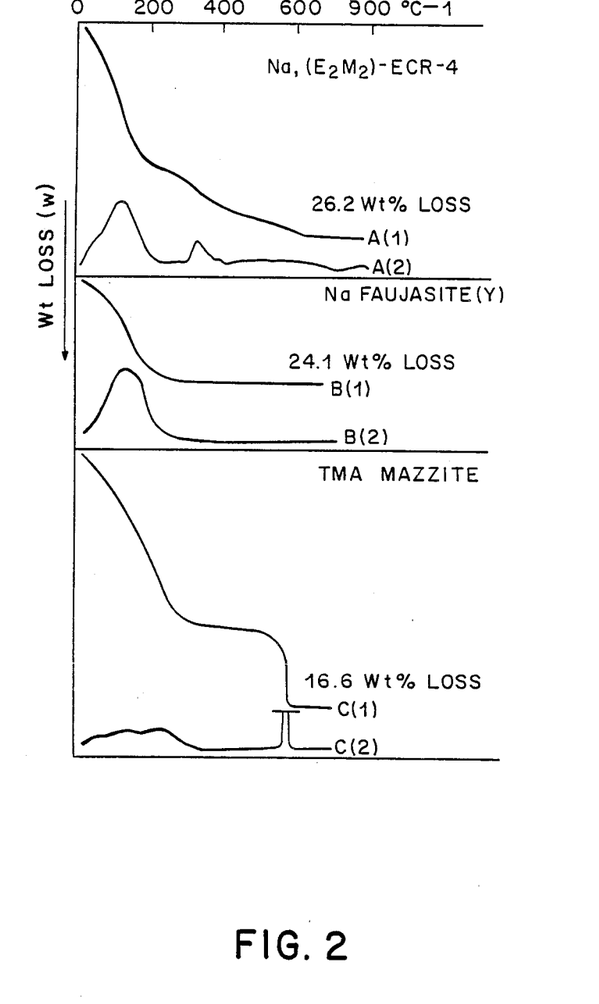
FIG. 2 shows weight loss curves (loss rate and total weight loss) as a function of temperature for ECR-4 containing bis-(2-hydroxy ethyl)dimethyl ammonium ions in the faujasite super cage (line A(1)=total wt. loss, line A(2)=rate of wt. loss), a conventional NaY (line B(1)=total wt. loss, B(2)=rate of wt. loss), and a mazzite containing tetramethyl-ammonium ions in the small gmelenite cages (line C(1)=total wt. loss, line C(2)=rate of wt. loss).

A further differentiating characteristic of ECR-4 is that the organic template is located in the "super cage" rather than the smaller sodalite cage. Although this can be demonstrated using $^{13}C$-MAS-NMR, it is also readily demonstrated by a simple thermogravimetric experiment in which a small sample is heated in a controlled fashion Typical weight loss curves as a function of temperature are shown in FIG. 2 for ECR-4 containing bis-(2-hydroxyethyl)dimethyl ammonium in the faujasite super cage (line A), a conventional NaY (line B) and a mazzite containing tetramethyl ammonium in the small gmelienite cages (line C). The low temperature weight loss (340° C.) corresponding to $E_2M_2$ release from the large faujasite cage is in distinct comparison with the high temperature weight loss (560° C.) characteristic of release of the template from a small cage in faujasite or mazzite.

EXAMPLES

The examples which follow illustrate the efficacy of the invention. In all examples, parts and percentages are given by weight and temperatures in degrees Centigrade unless otherwise noted.

Example 1

A slurry having a composition, in terms of mole ratios of oxides, of

| | |
|---|---|
| $T_2O:Al_2O_3$ | 0.6 |
| $Na_2O:Al_2O_3$ | 1.34 |
| $SiO_2:Al_2O_3$ | 7.48 |
| $H_2O:Al_2O_3$ | 109 | wherein T is a bis-(2-hydroxyethyl)dimethylammonium cation was prepared as follows: A sodium aluminate solution was produced by dissolving 29.2 g of $Al_2O_3.3H_2O$ in 56.46 g of NaOH solution containing 16.46 g of NaOH. An alum solution was made by dissolving 69.4 g of $Al_2(SO_4)_3.17 H_2O$ in 120 ml of water. Both of these solutions were added to a blender along with 458 g of a sodium silicate solution (composed of 8.9% $Na_2O$, 28.7% $SiO_2$ and 62.4% $H_2O$), 16 g of a slurry of zeolite nucleation seeds having a composition, in terms of mole ratios of oxides, as follows: 13.33 $Na_2O:Al_2O_3:12.5$ $SiO_2:267 H_2O$, aged at 25° C. for at least one day but not longer than two weeks as described in U.S. Pat. No. 4,178,352, and a solution of 50 g of bis-(2-hydroxyethyl)dimethylammonium chloride dissolved in 30 ml of water. After thorough homogenization of the mixture it was transferred to a polytetrafluoroethylene-line jar which was sealed and placed in a hot-air oven at 100° C. for six days. The produce obtained was recovered by filtration, washed with water, and dried in a 110° C. oven. The dried zeolite obtained was analyzed as having a chemical composition of:

0.1 $T_2O:0.9 Na_2O:Al_2O_3:6.98 SiO_2$ where T is a bis-(2-hydroxyethyl)dimethylammonium cation. The crystals were found by x-ray powder diffraction analysis to have a faujasite structure with a unit cell of 24.52 Å Sorption experiments showed this zeolite to have a capacity of 17.9% by weight for cyclohexane.

Figure 3A:
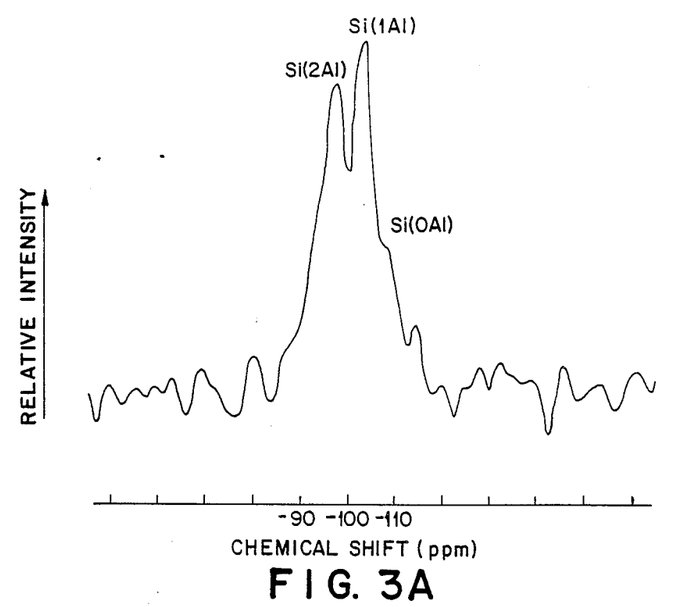
FIG. 3 shows a comparison of $^{29}Si$-MAS-NMR spectra for ECR-4 compositions made according to the examples.
Figure 3B:
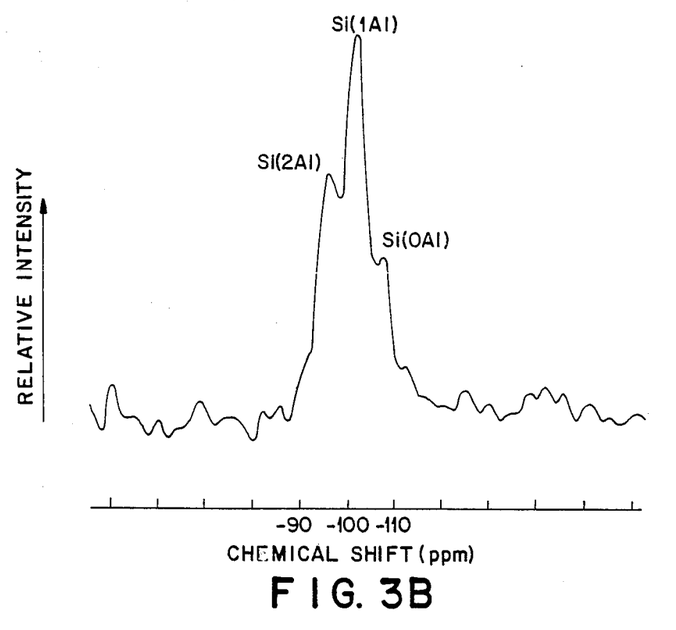

The $^{29}Si$ MAS-NMR spectrum is shown in FIG. 3B and gives a Si/Al value of 3.50.

Example 2 slurry having a composition, in terms of mole ratios of oxides, of:

| | |
|---|---|
| $T_2O:Al_2O_3$ | 2.0 |
| $Na_2O:Al_2O_3$ | 1.0 |
| $SiO_2:Al_2O_3$ | 9 |
| $H_2O:Al_2O_3$ | 135 | wherein T is a bis-(2-hydroxyethyl)dimethylammonium cation was prepared using the procedure given in Example 1 and the following amounts of ingredients:

| | |
|---|---|
| 10.63 g | NaOH |
| 13.54 g | $Al_2O_3.3H_2O$ |
| 256.8 g | sodium silicate solution |
| 33.96 g | $Al_2(SO_4)_3.17H_2O$ |
| 137.5 g | $H_2O$ |
| 47.5 g | seed solution of Example 1 |
| 306 g | 50% aqueous solution of bis-(2-hydroxyethyl)-dimethylammonium iodide |

After complete homogenization of the mixture it was transferred to a polytetrafluoroethylene-lined bottle, sealed and placed in a 100° C. hot-air oven for 49 hours. The aluminosilicate product obtained was recovered by filtration, washed with water, and dried in a 110° C. oven. The product obtained had chemical composition of:

0.17$T_2O:0.83 Na_2O:Al_2O_3:5.6 SiO_2$ where T is a bis-(2-hydroxyethyl)dimethylammonium cation. The x-ray powder diffraction pattern showed this product to have a pure faujasite structure with a unit cell value of 24.61 Å, cyclohexane sorption was found to be 18.0%, and the BET nitrogen surface area was 780 m²/g. Thermogravimetric analysis of the product revealed that the trapped organic cation T decomposed and escaped from the super cage at a temperature between 330° C. and 350° C.. The $^{29}Si$-MAS-NMR spectrum is given in FIG. 3A and gives an Si/Al value of 3.1, representing a stoichiometry of:

0.17$T_2O:0.83 Na_2O:Al_2O_3:6.2 SiO_2$

Example 3

A composition 1.8$R_2O:0.6Na_2O_3:9SiO_2:140H_2O$ was made by mixing together 53.32 gms colloidal silica (Ludox HS-40), 8 gms. sodium aluminate dissolved in 15 gms water, and 3.92 gms. seed material; 25.2 gms triethyl-methylammonium hydroxide were then added, followed by 4.56 gms aluminum sulfate (17$H_2O$) dissolved in 44.9 gms water. The composition was poured into a Teflon lined autoclave and heated at 150° C. for 10 days, after which time the product was prepared for analysis. X-ray analysis evidenced that it was faujasite with a unit cell of 24.56 Å. $^{29}Si$-NMR spectral analysis gave an Si/Al ratio of 3.4.

Example 4

A composition 1.2$R_2O:1.95 Na_2O:Al_2O_3:7.5 SiO_2:120 H_2O$ was made by mixing together 115.2 gms. Ludox HS-40, 13.7 gms. seed material, 146.8 gms bis(2-hydroxypropyl)dimethyl ammonium iodide (50 wt.% aqueous solution), and a sodium aluminate solution comprising 16.18 gms. $Al_2O_3.3H_2O$ and 14.54 gms. NaOH dissolved in 30 mls. water. Water was added to adjust the total weight to 183 gms. After reacting at 100° C. for six days the product was analyzed by x-ray diffraction and found to be faujasite. Analysis of the $^{29}Si$-NMR spectrum gave an Si/Al ratio of 3.36.

TABLE 1

| 29Si-MAS NMR SPECTRAL ANALYSES OF EX. 3 AND 4 | | | | |
|---|---|---|---|---|
| Example | 4Si | 3Si 1Al | 2Si 2Al | Si 3Al |
| 3 | 259 | 583 | 362 | 59 |
| 4 | 668 | 876 | 935 | 230 |

Example 5

This example demonstrates the use of tributyl methyl ammonium ($B_3MN$) in synthesizing ECR-4. A slurry composition:

3.6$(B_3MN)_2O: 1.2 Na_2O:Al_2O_3$ 18 $SiO_2:275 H_2O$ was made by reacting together:

| | |
|---|---|
| 40.6 gm | Ludox HS40 colloidal silica sol |
| 10.3 gm | seed solution |
| 62.3 gm | $B_3MNOH$ (40% aqueous solution) |
| 4.9 gms | sodium aluminate solution comprising 35 gms $Al_2O_3$ $3H_2O$ 27. gms NaOH |

| | |
|---|---|
| 7.4 gms | 58.9 gms H$_2$O<br>alum solution comprising<br>50 gms Al$_2$(SO$_4$)$_3$.17 H$_2$O<br>59.6 gms H$_2$O |

After 58 days reaction at 100° C., the product was cooled, filtered, washed and dried at 115° C. in an air oven. Chemical analysis (ICPES) gave 27.5% SiO$_2$; 5.53 Al; 2.03 Na indicating a stoichiometry of:
0.43 Na$_2$O:0.57 (B$_3$M)$_2$O:Al$_2$O$_3$:9.76 SiO$_2$

Example 6

This example duplicates Example 5, except that the B$_3$MNOH is replaced by tripropylmethyl ammonium hydroxide P$_3$MNOH, so that the slurry stoichiometry is:
3.6 (P$_3$MN)$_2$O:1.2 Na$_2$O:Al$_2$O$_3$:18 SiO$_2$:275 H$_2$O
and the P$_3$MNOH is added in the amount of 50.5 gms of a 40% aqueous solution. After 77 days reaction at 100° C., the product was excellent ECR-4, and even when reacted for a further 20 days continued to be excellent, showing no degradation or recrystallization to other products, such as mordenite. The product after 97 days had a chemical composition determined by ICPES of:
27.8% Si, 5.94% Al, 1.93 Na, representing an ECR-4 stoichiometry of:
0.38Na$_2$O:0.62 (P$_3$MN)$_2$O:Al$_2$O$_3$:9 SiO$_2$
assuming the template component by difference.

Example 7

Increasing the Si/Al ratio in the slurry of Example 6 to 24 further increases the Si/Al ratio of the product ECR-4. In this case a slurry of stoichiometry:
4.8 (P$_3$MN)$_2$O:1.6 Na$_2$O:Al$_2$O$_3$:24 SiO$_2$:350 H$_2$O
yields a product ECR-4 having a chemical composition (ICPES) of 28.5% SiO$_2$; 5.47% Al, 1.7% Na giving a stoichiometry of:
0.36 Na$_2$O:0.64 (P$_3$MN)$_2$):Al$_2$O$_3$:10 SiO$_2$,
the P$_3$MN+ component being derived by difference.

In summary, the present invention is seen to provide a novel crystalline aluminosilicate, ECR-4, which has a faujasite structure and a silica to alumina ratio of at least six, and contains alkyl ammonium cations within its structure which can be readily removed at relatively low calcination temperatures. Several ECR-4 containing examples of "unbalanced" alkyl ammonium cations are given.

What is claimed is:

1. An aluminosilicate characterized by having a faujasite structure with super cages and having the x-ray diffraction pattern

| d Spacing (Å) | Relative Intensity |
|---|---|
| 14.05–14.20 | VS |
| 8.60–8.70 | M |
| 7.32–7.44 | W |
| 7.00–7.15 | W |
| 5.58–5.65 | S |
| 4.68–4.75 | M |
| 4.30–4.35 | M |
| 3.85–3.90 | W |
| 3.70–3.75 | M-S |
| 3.40–3.45 | W |
| 3.25–3.30 | M |
| 2.97–3.05 | W |
| 2.87–2.90 | M-W |
| 2.81–2.84 | M |
| 2.72–2.75 | W |
| 2.59–2.63 | W |
| 2.34–2.37 | W | where VS=100-80; S=80-40; M=40-15; W=3-15 in absolute value ranges, a silica to alumina mole ratio of greater than six, and the presence of an unbalanced organic ammonium template R$_1$R$_2$R$_3$R$_4$N+ selected from the group where R$_1$ and R$_2$ are alkyl or hydroxyl alkyl groups having carbon numbers ranging separately from 1 to 4, and R$_3$ and R$_4$ are alkyl groups having carbon numbers ranging from 3 to 4 or hydroxy alkyl groups having carbon numbers ranging separately from 2 to 4, wherein said organic ammonium templates are within the super cages of said aluminosilicate.

2. The aluminosilicate of claim 1 further characterized by having a composition, in terms of mole ratios of oxides, in the range:
0.02 to 0.80T$_2$O:0.20 to 0.98Na$_2$O:Al$_2$O$_3$:greater than 6 to 12SiO$_2$:x$_{H2}$O
wherein T represents said organic ammonium template and x represents 0 or an integer from 1 to 25.

3. The aluminosilicate of claim 1 further characterized by having a composition, in terms of mole ratios of oxides, in the range:
0.02 to 0.40 T$_2$O:0.60 to 0.98 Na$_2$O:Al$_2$O$_3$:greater than 6 to 8 SiO$_2$
wherein T is selected from the group consisting of bis-(2-hydroxyethyl)dimethylammonium and bis-(2-hydroxypropyl)dimethylammonium.

4. A process for preparing the aluminosilicate of claim 1 which comprises:
(a) preparing a reaction mixture comprising an oxide of sodium, an unbalanced organic ammonium salt selected from the group having the formula R$_1$R$_2$R$_3$R$_4$N where R$_1$ and R$_2$ are alkyl or hydroxy alkyl groups having carbon numbers ranging separately from 1 to 4 and R$_3$ and R$_4$ are alkyl groups having carbon numbers ranging from 3 to 4 or hydroxy alkyl groups having carbon numbers ranging separately from 2 to 4, water, a source of silica, a source of alumina, and sodium aluminosilicate nucleating seeds, said reaction mixture having a composition, in terms of mole ratios of oxides, within the following ranges:

| | |
|---|---|
| (Na,T)$_2$O:Al$_2$O$_3$ | 1.6 to 8 |
| SiO$_2$:Al$_2$O$_2$ | 6 to 40 |
| H$_2$O:Al$_2$O$_3$ | 100 to 400 | where T represents the cation of the organic ammonium template, and said seeds being present in an amount to yield 0.1 to 10 mole percent of the total final alumina content in said aluminosilicate;
(b) blending the reaction mixture sufficiently to form a substantially homogeneous mixture;
(c) maintaining the reaction mixture at between about 70° C. and 120° C. under autogenous pressure for a sufficient period of time to form crystals of said aluminosilicate; and
(d) recovering said aluminosilicate crystals.

5. The process of claim 4 wherein the aluminosilicate has a composition, in terms of mole ratios of oxides, in the range:

0.02 to 0.80$T_2O$:0.20 to 0.98$Na_2O$:$Al_2O_3$:6 to 10$SiO_2$:x$H_2O$ wherein T represents a bis-(2-hydroxypropyl)dimethylammonium or bis-(2-hydroxyethyl)dimethylammonium group and x represents 0 or an integer from 1 to 25.

6. The process of claim 4 wherein the source of silica is sodium silicate and the sources of alumina are hydrated alumina and an aluminum salt selected from the group consisting of the chloride, sulfate and nitrate salts.

7. The process of claim 4 wherein the reaction mixture is maintained between 90° C. and 120° C.

8. A process for preparing an aluminosilicate having a faujasite structure, a silica to alumina mole ratio of at least four, and T cations within the super cages of said aluminosilicate which comprises the steps of:

(a) preparing a reaction mixture comprising sodium aluminate, water, sodium silicate, aluminum sulfate, T halide and nucleating seeds, said reaction mixture having a composition, in terms of mole ratios of oxides, within the following ranges:

| (Na,T)$_2$O:Al$_2$O$_3$ | 1.6 to 8 |
| SiO$_2$:Al$_2$O$_2$ | 6 to 40 |
| H$_2$O:Al$_2$O$_3$ | 100 to 400 | wherein T represents a bis-(2-hydroxyethyl)dimethylammonium, a bis-(2-hydroxypropyl)dimethylammonium, a tributylmethyl ammonium or a tripropylmethyl ammonium group, and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture between 90° and 120° C. under autogenous pressure for a sufficient period of time to form crystals of said aluminosilicate; and (d) recovering said aluminosilicate crystals.

9. The process of claim 8 wherein the aluminosilicate has a composition, in terms of mole ratios of oxides, in the range:

0.02 to 0.80 $T_2O$:0.20 to 0.98 $Na_2O$:$Al_2O_3$:6 to 12 $SiO_2$:x$H_2O$ where T represents a bis-(2-hydroxypropyl)dimethylammonium group and x represents 0 or an integer from 1 to 25.

10. The process of claim 9 wherein the aluminosilicate has a composition in terms of mole ratios of oxides in the range:

0.02 to 0.80 $T_2O$:0.20 to 0.98 $Na_2O$:$Al_2O_3$:6 to 12 $SiO_2$:x$H_2O$ wherein T represents a tributylmethyl ammonium group or a tripropylmethyl ammonium group.

11. A product of claim 1 further calcined to remove the organic components.

12. A product of claim 1 exchanged with cations of elements of groups 1-8 of the Periodic Table.

* * * * *